(12) United States Patent
Ducher

(10) Patent No.: X3455
(45) Date of Patent: Feb. 12, 1822

(54) PLOUGH, CAST IRON

(76) Inventor: Josiah Ducher

2—328 a.

DRAFTSMAN'S DIVISION.

All communications should be addressed to "The Commissioner of Patents, Washington, D. C."

*DEPARTMENT OF THE INTERIOR,*

United States Patent Office,

*Washington, D. C.,* ........................ , *189*...

*SIR:*

*The printed* copies ........ *of Patent No.* I Dutcher Feb 12 1822

........ are ........ *exhausted.*

*As soon as printed a copy will be mailed you to complete your order.*

*By direction of the Commissioner:*

*Very respectfully,*

........................................

*Chief Clerk.*

3142b6-97-5m